(12) United States Patent
St. Gray et al.

(10) Patent No.: US 12,709,298 B2
(45) Date of Patent: Aug. 18, 2026

(54) SYSTEM TO COMMUNICATE VEHICLE INTENT USING PROJECTION

(71) Applicant: Nissan North America, Inc., Franklin, TN (US)

(72) Inventors: Erik Lee St. Gray, Tacoma, WA (US); Marcell Jose Vazquez-Chanlatte, Palo Alto, CA (US); Mark Bailey, Seattle, WA (US)

(73) Assignee: Nissan North America, Inc., Franklin, TN (US)

( * ) Notice: Subject to any disclaimer, the term of this patent is extended or adjusted under 35 U.S.C. 154(b) by 26 days.

(21) Appl. No.: 18/821,367

(22) Filed: Aug. 30, 2024

(65) Prior Publication Data

US 2026/0062032 A1 Mar. 5, 2026

(51) Int. Cl.

| | |
|---|---|
| ***B60W 60/00*** | (2020.01) |
| ***B60Q 1/50*** | (2006.01) |
| ***B60W 30/095*** | (2012.01) |
| ***G06F 40/56*** | (2020.01) |
| ***G06V 20/56*** | (2022.01) |

(Continued)

(52) U.S. Cl.
CPC ......... *B60W 60/0015* (2020.02); *B60Q 1/507* (2022.05); *B60W 30/0956* (2013.01); *G06F 40/56* (2020.01); *G06V 20/56* (2022.01); *G06V 40/10* (2022.01); *G06V 40/28* (2022.01); *B60Q 2400/50* (2013.01); *B60Q 2800/10* (2022.05); *B60W 2420/403* (2013.01)

(58) Field of Classification Search
CPC ......... B60W 60/0015; B60W 30/0956; B60W 2420/403; B60Q 1/507; B60Q 2400/50; B60Q 2800/10; G06F 40/56; G06V 20/56; G06V 40/10; G06V 40/28
See application file for complete search history.

(56) References Cited

U.S. PATENT DOCUMENTS

| | | | | |
|---|---|---|---|---|
| 9,984,579 | B1 * | 5/2018 | Harris | G06V 20/17 |
| 2014/0222277 | A1 * | 8/2014 | Tsimhoni | B60W 30/00 701/23 |
| 2019/0061611 | A1 * | 2/2019 | Dellock | G08G 1/096741 |

(Continued)

FOREIGN PATENT DOCUMENTS

| | | | | |
|---|---|---|---|---|
| WO | WO-2017102298 A1 * | 6/2017 | | B60Q 1/525 |

OTHER PUBLICATIONS

Machine Translation of WO2017102298 (Year: 2017).*

*Primary Examiner* — Anne Marie Antonucci
*Assistant Examiner* — Jordan T Smith
(74) *Attorney, Agent, or Firm* — Young Basile Hanlon & MacFarlane, P.C.

(57) ABSTRACT

Communicating vehicle intent using projection includes receiving an exception scene generated using scene data captured by one or more systems of a vehicle. The exception scene is indicated by a detection of at least one potential hazard to a safe operation of the vehicle, and the vehicle includes a projector. A hazard type associated with the potential hazard(s) and one or more gestures are determined using the exception scene. A drive plan for the vehicle based on the hazard type and the one or more gestures is generated. A representation of the drive plan in an area external of the vehicle is displayed, using the projector of the vehicle, in a visually perceptible manner. The drive plan is executed by a control system of the vehicle.

18 Claims, 7 Drawing Sheets

(51) Int. Cl.
*G06V 40/10* (2022.01)
*G06V 40/20* (2022.01)

(56) References Cited

U.S. PATENT DOCUMENTS

| | | | | |
|---|---|---|---|---|
| 2019/0135169 | A1* | 5/2019 | Conger | B60Q 1/525 |
| 2020/0039427 | A1* | 2/2020 | Chen | B60Q 1/507 |
| 2020/0398743 | A1* | 12/2020 | Huber | B60W 30/0956 |
| 2021/0380137 | A1* | 12/2021 | Domeyer | G06V 20/56 |
| 2022/0048429 | A1* | 2/2022 | Verbeke | B60Q 1/507 |
| 2022/0390251 | A1* | 12/2022 | Suzuki | B60Q 1/34 |
| 2023/0067538 | A1* | 3/2023 | Willoughby | B60W 60/0015 |
| 2023/0271548 | A1* | 8/2023 | Shibata | B60Q 1/543 340/468 |
| 2024/0310851 | A1* | 9/2024 | Ebrahimi Afrouzi | G01S 17/87 |
| 2025/0222934 | A1* | 7/2025 | Ren | G06V 40/10 |

* cited by examiner

SYSTEM TO COMMUNICATE VEHICLE INTENT USING PROJECTION

TECHNICAL FIELD

This application relates to communication systems for autonomous vehicles, specifically to methods and apparatus for projecting drive plans and interactive instructions during exceptional scenarios to enhance interaction with people nearby.

BACKGROUND

Autonomous vehicles (AVs) are increasingly navigating complex real-world scenarios, including construction zones, accident sites, and other situations where human interaction and guidance may be necessary. However, current autonomous vehicle (AV) systems often struggle to effectively communicate their understanding of these scenarios and their intended actions to people in the vicinity. This lack of clear communication can lead to misunderstandings, increased risks, and decreased public trust in AV technology. Furthermore, without a reliable mechanism for soliciting and incorporating human feedback, AVs may make decisions that are suboptimal.

SUMMARY

Disclosed herein are aspects, features, elements, and embodiments for analyzing a vehicle interior for forgotten items and properly notifying an individual for retrieval.

A first aspect of the teachings herein is a method. The method includes receiving an exception scene generated using scene data captured by one or more systems of a vehicle, wherein the exception scene is indicated by a detection of at least one potential hazard to a safe operation of the vehicle and the vehicle comprises a projector, determining a hazard type associated with the at least one potential hazard and one or more gestures using the exception scene, generating a drive plan for the vehicle based on the hazard type and the one or more gestures, displaying, using the projector, a representation of the drive plan in an area external of the vehicle in a visually perceptible manner, and executing, by a control system of the vehicle, the drive plan.

A second aspect of the teachings herein is an apparatus that includes a memory subsystem and one or more processors. The one or more processors is configured to receive an exception scene generated using scene data captured by one or more systems of a vehicle, wherein the exception scene is indicated by a detection of at least one potential hazard to a safe operation of the vehicle and the vehicle comprises a projector, determine a hazard type associated with the at least one potential hazard and one or more gestures using the exception scene, generate a drive plan for the vehicle based on the hazard type and the one or more gestures, display, using the projector, a representation of the drive plan in an area external of the vehicle in a visually perceptible manner; and execute, by a control system of the vehicle, the drive plan.

A third aspect of the teachings herein is a non-transitory computer-readable medium storing instructions operable to cause one or more processors to perform operations that include receiving an exception scene generated using scene data captured by one or more systems of a vehicle, wherein the exception scene is indicated by a detection of at least one potential hazard to a safe operation of the vehicle and the vehicle comprises a projector, determining a hazard type associated with the at least one potential hazard and one or more gestures using the exception scene, generating a drive plan for the vehicle based on the hazard type and the one or more gestures, displaying, using the projector, a representation of the drive plan in an area external of the vehicle in a visually perceptible manner, and executing, by a control system of the vehicle, the drive plan.

These and other aspects of the present disclosure are disclosed in the following detailed description of the embodiments, the appended claims, and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings may not be to scale. On the contrary, the dimensions of the various features may be arbitrarily expanded or reduced for clarity. Further, like reference numbers refer to like elements throughout the drawings unless otherwise noted.

DETAILED DESCRIPTION

Figure 1:
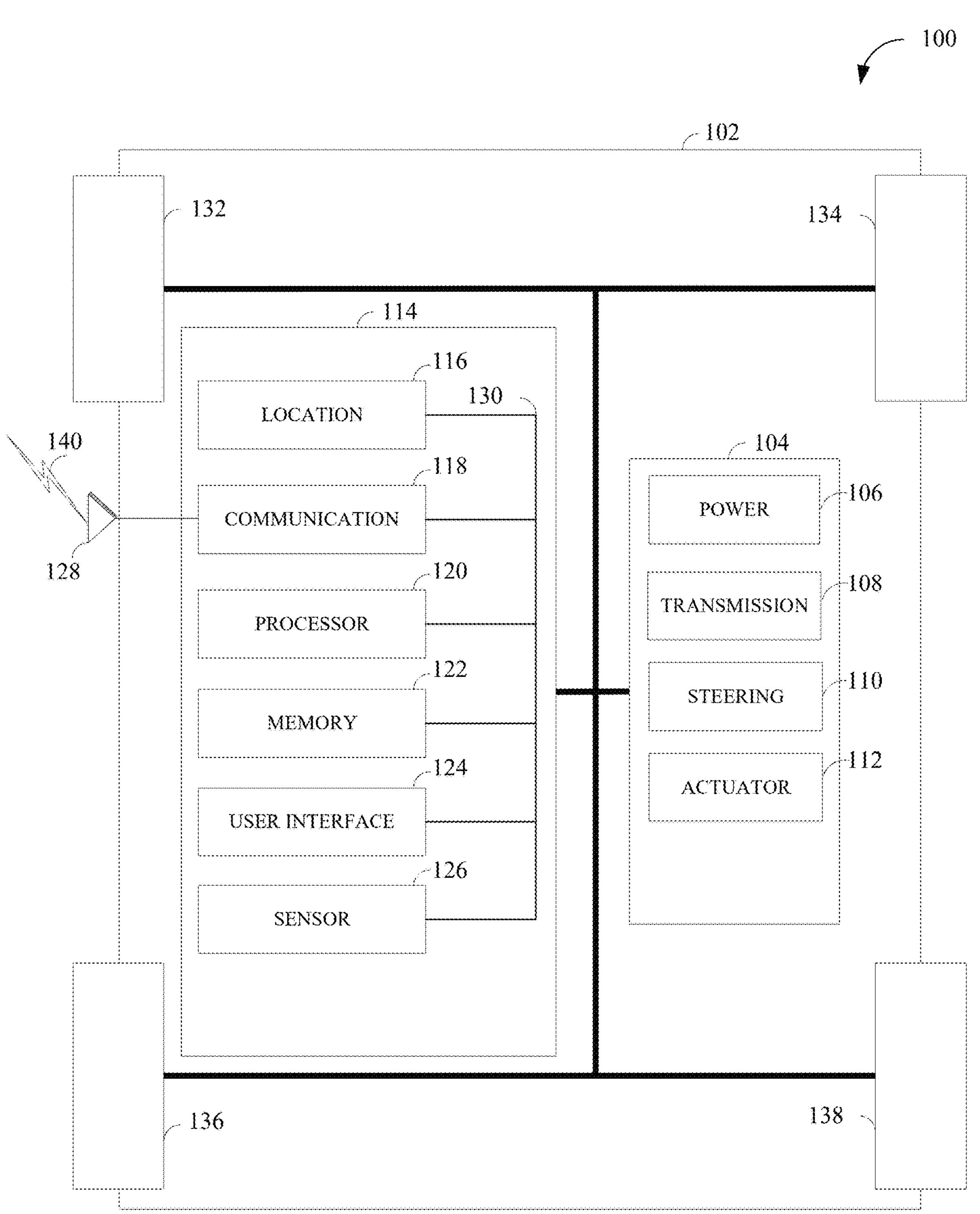
FIG. 1 is a diagram of an example of a portion of a vehicle in which the aspects, features, and elements disclosed herein may be implemented.

AVs are poised to revolutionize transportation, but their safe and efficient operation in complex real-world scenarios remains a challenge. These scenarios (i.e., exception scenes) include but are not limited to construction zones, accident sites, blocked roads, parking lots, gas stations, car washes, cross walks, or any situation that deviates from the expected operating environment of the AV. In these situations, the AV may encounter obstacles, unexpected traffic patterns, or even people who need to interact with the AV for guidance.

Current AV systems often struggle to effectively communicate their understanding of these exceptional scenes and their intended actions to nearby individuals. The lack of clear, intuitive communication can lead to confusion, mistrust, and potentially dangerous situations. For example, a pedestrian may not understand why an AV has stopped abruptly or how the AV plans to navigate around an obstacle. This uncertainty can cause the pedestrian to hesitate or act in unpredictable ways.

Furthermore, existing AV communication methods primarily rely on visual cues like flashing lights or simple displays. While these may suffice in standard driving situations, they often fall short in conveying complex information during exception scenes. Additionally, these systems often lack the capability to solicit and incorporate feedback from humans on the scene, leading to missed opportunities for collaboration and less effective decisions.

To address these challenges, a new approach to AV communication is needed. This approach should prioritize clear, intuitive communication of the AV's perception of the scene, the intended actions of the AV, and any potential hazards. It should also provide mechanisms for soliciting and incorporating human feedback, enabling collaboration and effective navigation in exceptional scenarios. By bridging the communication gap between the AV and humans, this solution can foster trust, improve safety, and accelerate the widespread adoption of autonomous vehicle technology.

Implementation of this disclosure addresses these challenges by providing a comprehensive communication system for AVs. The system utilizes the existing sensors (e.g., cameras, lidar, radar) of the AV to detect and classify potential hazards in real-time. Machine learning (ML) models, trained on extensive datasets of real-world scenarios and human gestures, enable the AV to accurately interpret the situation and predict appropriate actions. The system then generates a drive plan that considers both the detected hazards and any relevant input from nearby individuals. This drive plan is not simply executed but is also translated into a visually intuitive representation using a predetermined set of symbols (e.g., icons, pictograms, glyphs, emblems, etc.), and the drive plan is projected onto the surrounding environment using a display system, such as a laser projector. This projection allows people in the vicinity to easily understand the intended path and actions of the AV. Additionally, the system can initiate interactive communication, such as through displayed questions generated by a large language model (LLM), to solicit feedback and confirm understanding before proceeding. This closed-loop communication system fosters trust, enhances safety, and facilitates more effective interaction between AVs and humans in exceptional scenarios.

To describe some embodiments of the system to communicate vehicle intent using projection according to the teachings herein in greater detail, reference is first made to the environment in which this disclosure may be implemented.

FIG. 1 is a diagram of an example of a portion of a vehicle 100 in which the aspects, features, and elements disclosed herein may be implemented. The vehicle 100 includes a chassis 102, a powertrain 104, a controller 114, wheels 132/134/136/138, and may include any other element or combination of elements of a vehicle. Although the vehicle 100 is shown as including four wheels 132/134/136/138 for simplicity, any other propulsion device or devices, such as a propeller or tread, may be used. In FIG. 1, the lines interconnecting elements, such as the powertrain 104, the controller 114, and the wheels 132/134/136/138, indicate that information, such as data or control signals; power, such as electrical power or torque; or both information and power may be communicated between the respective elements. For example, the controller 114 may receive power from the powertrain 104 and communicate with the powertrain 104, the wheels 132/134/136/138, or both, to control the vehicle 100, which can include accelerating, decelerating, steering, or otherwise controlling the vehicle 100.

The powertrain 104 includes a power source 106, a transmission 108, a steering unit 110, a vehicle actuator 112, and may include any other element or combination of elements of a powertrain, such as a suspension, a drive shaft, axles, or an exhaust system. Although shown separately, the wheels 132/134/136/138 may be included in the powertrain 104.

The power source 106 may be any device or combination of devices operative to provide energy, such as electrical energy, thermal energy, or kinetic energy. For example, the power source 106 includes an engine, such as an internal combustion engine, an electric motor, or a combination of an internal combustion engine and an electric motor, and is operative to provide kinetic energy as a motive force to one or more of the wheels 132/134/136/138. In some embodiments, the power source 106 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 108 receives energy, such as kinetic energy, from the power source 106 and transmits the energy to the wheels 132/134/136/138 to provide a motive force. The transmission 108 may be controlled by the controller 114, the vehicle actuator 112, or both. The steering unit 110 may be controlled by the controller 114, the vehicle actuator 112, or both and controls the wheels 132/134/136/138 to steer the vehicle. The vehicle actuator 112 may receive signals from the controller 114 and may actuate or control the power source 106, the transmission 108, the steering unit 110, or any combination thereof to operate the vehicle 100.

In the illustrated embodiment, the controller 114 includes a location unit 116, an electronic communication unit 118, a processor 120, a memory 122, a user interface 124, a sensor 126, and an electronic communication interface 128. Although shown as a single unit, any one or more elements of the controller 114 may be integrated into any number of separate physical units. For example, the user interface 124 and the processor 120 may be integrated in a first physical unit, and the memory 122 may be integrated in a second physical unit. Although not shown in FIG. 1, the controller 114 may include a power source, such as a battery. Although shown as separate elements, the location unit 116, the electronic communication unit 118, the processor 120, the memory 122, the user interface 124, the sensor 126, the electronic communication interface 128, or any combination thereof can be integrated in one or more electronic units, circuits, or chips.

In some embodiments, the processor 120 includes any device or combination of devices, now-existing or hereafter developed, capable of manipulating or processing a signal or other information, for example optical processors, quantum processors, molecular processors, or a combination thereof. For example, the processor 120 may include one or more special-purpose processors, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, one or more state machines, or any combination thereof. The processor 120 may be operatively coupled with the location unit 116, the memory 122, the electronic communication interface 128, the electronic communication unit 118, the user interface 124, the sensor 126, the powertrain 104, or any combination thereof. For example, the processor may be operatively coupled with the memory 122 via a communication bus 130.

The processor 120 may be configured to execute instructions. Such instructions may include instructions for remote operation, which may be used to operate the vehicle 100 from a remote location, including the operations center. The instructions for remote operation may be stored in the vehicle 100 or received from an external source, such as a traffic management center, or server computing devices, which may include cloud-based server computing devices. The processor 120 may also implement some or all of the proactive risk mitigation described herein.

The memory 122 may include any tangible non-transitory computer-usable or computer-readable medium capable of, for example, containing, storing, communicating, or transporting machine-readable instructions or any information associated therewith, for use by or in connection with the processor 120. The memory 122 may include, for example, one or more solid state drives, one or more memory cards, one or more removable media, one or more read-only memories (ROM), one or more random-access memories (RAM), one or more registers, one or more low power double data rate (LPDDR) memories, one or more cache memories, one or more disks (including a hard disk, a floppy disk, or an optical disk), a magnetic or optical card, or any type of non-transitory media suitable for storing electronic information, or any combination thereof.

The electronic communication interface 128 may be a wireless antenna, as shown, a wired communication port, an optical communication port, or any other wired or wireless unit capable of interfacing with a wired or wireless electronic communication medium 140.

The electronic communication unit 118 may be configured to transmit or receive signals via the wired or wireless electronic communication medium 140, such as via the electronic communication interface 128. Although not explicitly shown in FIG. 1, the electronic communication unit 118 is configured to transmit, receive, or both via any wired or wireless communication medium, such as radio frequency (RF), ultraviolet (UV), visible light, fiber optic, wire line, or a combination thereof. Although FIG. 1 shows a single electronic communication unit 118 and a single electronic communication interface 128, any number of communication units and any number of communication interfaces may be used. In some embodiments, the electronic communication unit 118 can include a dedicated short-range communications (DSRC) unit, a wireless safety unit (WSU), Institute of Electrical and Electronics Engineers (IEEE) 802.11p (WiFi-P), or a combination thereof.

The location unit 116 may determine geolocation information, including but not limited to longitude, latitude, elevation, direction of travel, or speed, of the vehicle 100. For example, the location unit includes a global positioning system (GPS) unit, such as a Wide Area Augmentation System (WAAS) enabled National Marine Electronics Association (NMEA) unit, a radio triangulation unit, or a combination thereof. The location unit 116 can be used to obtain information that represents, for example, a current heading of the vehicle 100, a current position of the vehicle 100 in two or three dimensions, a current angular orientation of the vehicle 100, or a combination thereof.

The user interface 124 may include any unit capable of being used as an interface by a person, including any of a virtual keypad, a physical keypad, a touchpad, a display, a touchscreen, a speaker, a microphone, a video camera, a sensor, and a printer. The user interface 124 may be operatively coupled with the processor 120, as shown, or with any other element of the controller 114. Although shown as a single unit, the user interface 124 can include one or more physical units. For example, the user interface 124 includes an audio interface for performing audio communication with a person, and a touch display for performing visual and touch-based communication with the person.

The sensor 126 may include one or more sensors, such as an array of sensors, which may be operable to provide information that may be used to control the vehicle. The sensor 126 can provide information regarding current operating characteristics of the vehicle or its surroundings. The sensor 126 includes, for example, a speed sensor, acceleration sensors, a steering angle sensor, traction-related sensors, braking-related sensors, or any sensor, or combination of sensors, that is operable to report information regarding some aspect of the current dynamic situation of the vehicle 100.

In some embodiments, the sensor 126 includes sensors that are operable to obtain information regarding the physical environment surrounding the vehicle 100. For example, one or more sensors detect road geometry and obstacles, such as fixed obstacles, vehicles, cyclists, and pedestrians. The sensor 126 can be or include one or more video cameras, laser-sensing systems, infrared-sensing systems, acoustic-sensing systems, or any other suitable type of on-vehicle environmental sensing device, or combination of devices, now known or later developed. The sensor 126 and the location unit 116 may be combined.

Although not shown separately, the vehicle 100 may include a trajectory controller. For example, the controller 114 may include a trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller outputs signals operable to control the vehicle 100 such that the vehicle 100 follows the trajectory that is determined by the trajectory controller. For example, the output of the trajectory controller can be an optimized trajectory that may be supplied to the powertrain 104, the wheels 132/134/136/138, or both. The optimized trajectory can be a control input, such as a set of steering angles, with each steering angle corresponding to a point in time or a position. The optimized trajectory can be one or more paths, lines, curves, or a combination thereof.

One or more of the wheels 132/134/136/138 may be a steered wheel, which is pivoted to a steering angle under control of the steering unit 110; a propelled wheel, which is torqued to propel the vehicle 100 under control of the transmission 108; or a steered and propelled wheel that steers and propels the vehicle 100.

A vehicle may include units or elements not shown in FIG. 1, such as an enclosure, a Bluetooth® module, a frequency modulated (FM) radio unit, a Near-Field Communication (NFC) module, a liquid crystal display (LCD) display unit, an organic light-emitting diode (OLED) display unit, a speaker, or any combination thereof.

The vehicle, such as the vehicle 100, may be an autonomous vehicle or a semi-autonomous vehicle. For example, as used herein, an autonomous vehicle as used herein should be understood to encompass a vehicle that includes an advanced driver assist system (ADAS). An ADAS can automate, adapt, and/or enhance vehicle systems for safety and better driving such as by circumventing or otherwise correcting driver errors.

Figure 2:
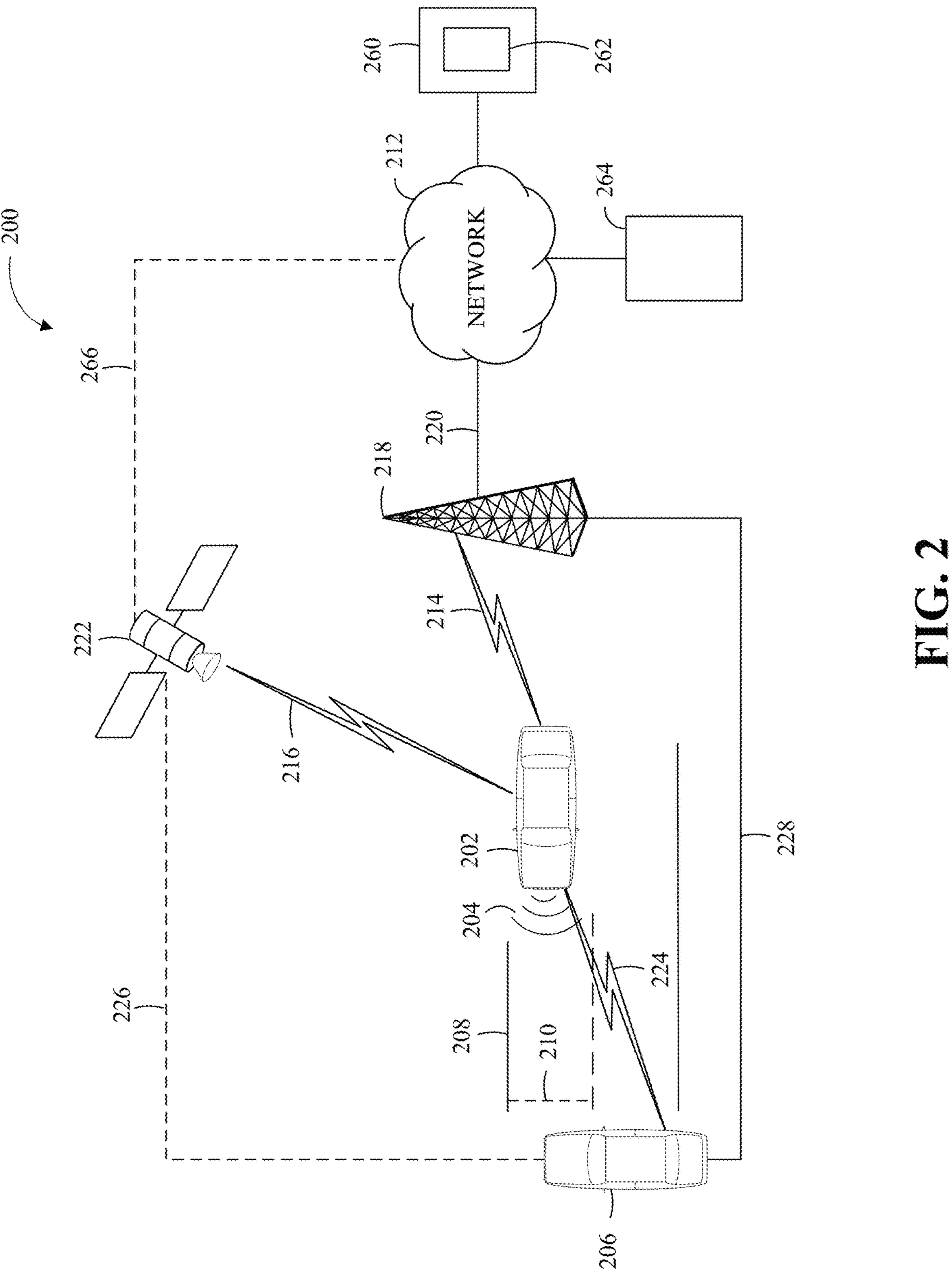
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 200 in which the aspects, features, and elements disclosed herein may be implemented. The vehicle transportation and communication system 200 includes a vehicle 202, such as the vehicle 100 shown in FIG. 1, and one or more external objects, such as an external object 206, which can include any form of transportation, such as the vehicle 100 shown in FIG. 1, a pedestrian, cyclist, as well as any form of a structure, such as a building. The vehicle 202 may travel via one or more portions of a transportation network 208 and may communicate with the external object 206 via one or more of an electronic communication network 212. Although not explicitly shown in FIG. 2, a vehicle may traverse an area that is not expressly or completely included in a transportation network, such as an off-road area. In some embodiments, the transportation network 208 may include one or more of a vehicle detection sensor 210, such as an inductive loop sensor, which may be used to detect the movement of vehicles on the transportation network 208.

The electronic communication network 212 may be a multiple access system that provides for communication, such as voice communication, data communication, video communication, messaging communication, or a combination thereof, between the vehicle 202, the external object 206, and an operations center 230. For example, the vehicle 202 or the external object 206 may receive information, such as information representing the transportation network 208, from the operations center 230 via the electronic communication network 212.

The operations center 230 includes a controller apparatus 232, which includes some or all of the features of the controller 114 shown in FIG. 1. The controller apparatus 232 can monitor and coordinate the movement of vehicles, including autonomous vehicles. The controller apparatus 232 may monitor the state or condition of vehicles, such as the vehicle 202, and external objects, such as the external object 206. The controller apparatus 232 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 232 can establish remote control over one or more vehicles, such as the vehicle 202, or external objects, such as the external object 206. In this way, the controller apparatus 232 may teleoperate the vehicles or external objects from a remote location. The controller apparatus 232 may exchange (send or receive) state data with vehicles, external objects, or a computing device, such as the vehicle 202, the external object 206, or a server computing device 234, via a wireless communication link, such as the wireless communication link 226, or a wired communication link, such as the wired communication link 228.

The server computing device 234 may include one or more server computing devices, which may exchange (send or receive) state signal data with one or more vehicles or computing devices, including the vehicle 202, the external object 206, or the operations center 230, via the electronic communication network 212.

In some embodiments, the vehicle 202 or the external object 206 communicates via the wired communication link 228, a wireless communication link 214/216/224, or a combination of any number or types of wired or wireless communication links. For example, as shown, the vehicle 202 or the external object 206 communicates via a terrestrial wireless communication link 214, via a non-terrestrial wireless communication link 216, or via a combination thereof. In some embodiments, a terrestrial wireless communication link 214 includes an Ethernet link, a serial link, a Bluetooth link, an infrared (IR) link, an ultraviolet (UV) link, or any link capable of electronic communication.

A vehicle, such as the vehicle 202, or an external object, such as the external object 206, may communicate with another vehicle, external object, or the operations center 230. For example, a host, or subject, vehicle 202 may receive one or more automated inter-vehicle messages, such as a basic safety message (BSM), from the operations center 230 via a direct communication link 224 or via an electronic communication network 212. For example, the operations center 230 may broadcast the message to host vehicles within a defined broadcast range, such as three hundred meters, or to a defined geographical area. In some embodiments, the vehicle 202 receives a message via a third party, such as a signal repeater (not shown) or another remote vehicle (not shown). In some embodiments, the vehicle 202 or the external object 206 transmits one or more automated inter-vehicle messages periodically based on a defined interval, such as one hundred milliseconds.

The vehicle 202 may communicate with the electronic communication network 212 via an access point 218. The access point 218, which may include a computing device, is configured to communicate with the vehicle 202, with the electronic communication network 212, with the operations center 230, or with a combination thereof via wired or wireless communication links 214/220. For example, an access point 218 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 202 may communicate with the electronic communication network 212 via a satellite 222 or other non-terrestrial communication device. The satellite 222, which may include a computing device, may be configured to communicate with the vehicle 202, with the electronic communication network 212, with the operations center 230, or with a combination thereof via one or more communication links 216/236. Although shown as a single unit, a satellite can include any number of interconnected elements.

The electronic communication network 212 may be any type of network configured to provide for voice, data, or any other type of electronic communication. For example, the electronic communication network 212 includes a local area network (LAN), a wide area network (WAN), a virtual private network (VPN), a mobile or cellular telephone network, the Internet, or any other electronic communication system. The electronic communication network 212 may use a communication protocol, such as the Transmission Control Protocol (TCP), the User Datagram Protocol (UDP), the Internet Protocol (IP), the Real-time Transport Protocol (RTP), the Hyper Text Transport Protocol (HTTP), or a combination thereof. Although shown as a single unit, an electronic communication network can include any number of interconnected elements.

In some embodiments, the vehicle 202 communicates with the operations center 230 via the electronic communication network 212, access point 218, or satellite 222. The operations center 230 may include one or more computing devices, which are able to exchange (send or receive) data from a vehicle, such as the vehicle 202; data from external objects, including the external object 206; or data from a computing device, such as the server computing device 234.

In some embodiments, the vehicle 202 identifies a portion or condition of the transportation network 208. For example, the vehicle 202 may include one or more on-vehicle sensors 204, such as the sensor 126 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 208.

The vehicle 202 may traverse one or more portions of the transportation network 208 using information communicated via the electronic communication network 212, such as information representing the transportation network 208, information identified by one or more on-vehicle sensors 204, or a combination thereof. The external object 206 may be capable of all or some of the communications and actions described above with respect to the vehicle 202.

For simplicity, FIG. 2 shows the vehicle 202 as the host vehicle, the external object 206, the transportation network 208, the electronic communication network 212, and the operations center 230. However, any number of vehicles, networks, or computing devices may be used. In some embodiments, the vehicle transportation and communication system 200 includes devices, units, or elements not shown in FIG. 2.

Although the vehicle 202 is shown communicating with the operations center 230 via the electronic communication network 212, the vehicle 202 (and the external object 206) may communicate with the operations center 230 via any number of direct or indirect communication links. For example, the vehicle 202 or the external object 206 may communicate with the operations center 230 via a direct communication link, such as a Bluetooth communication link. Although, for simplicity, FIG. 2 shows one of the transportation network 208 and one of the electronic communication network 212, any number of networks or communication devices may be used.

The external object 206 is illustrated as a second, remote vehicle in FIG. 2. An external object is not limited to another vehicle. An external object may be any infrastructure element, for example, a fence, a sign, a building, etc., that has the ability transmit data to the operations center 230. The data may be, for example, sensor data from the infrastructure element.

Figure 3:
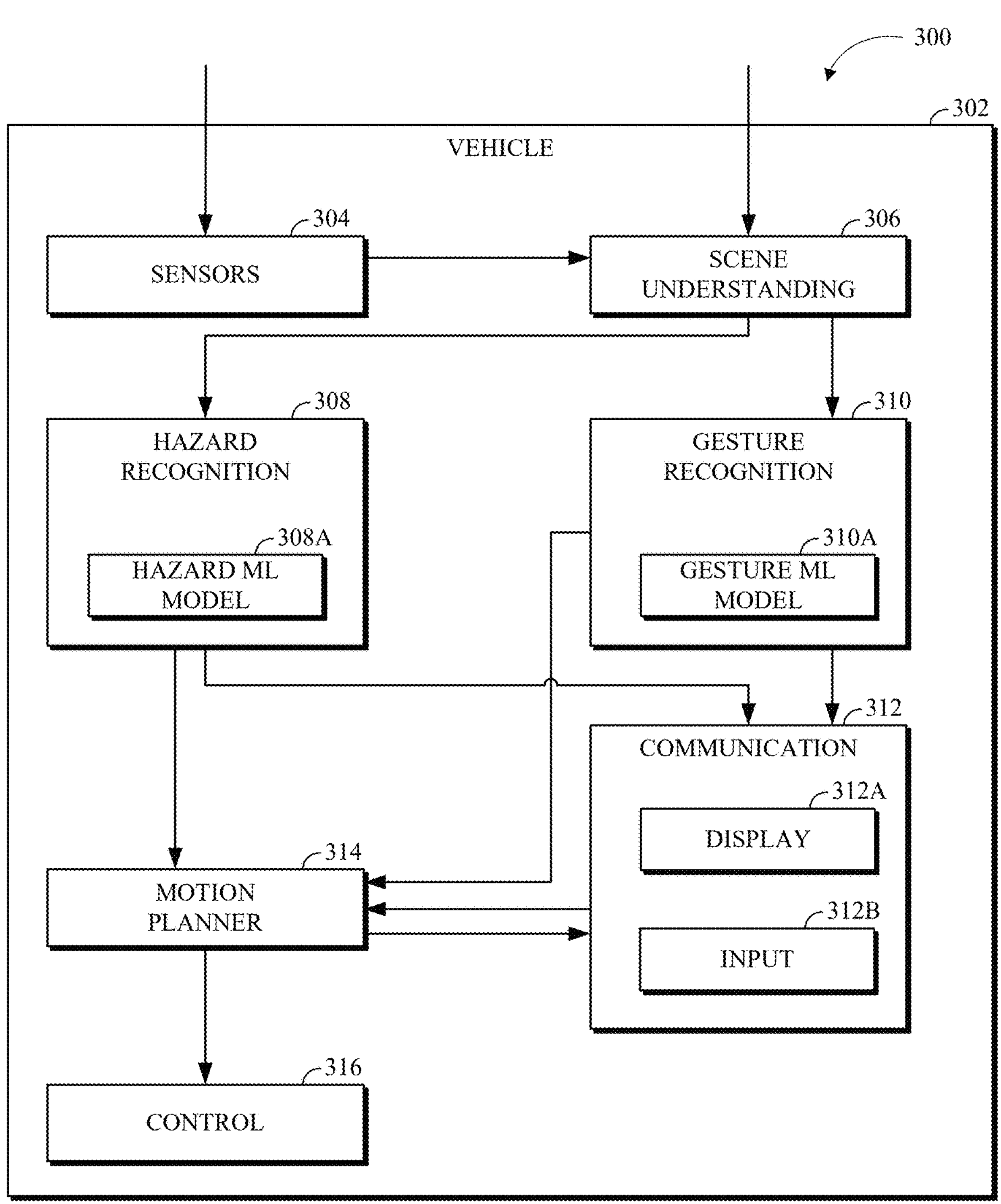
FIG. 3 is an overview of a system to communicate vehicle intent using projection.

FIG. 3 is an overview of a system 300 to communicate vehicle intent using projection. Although described with a vehicle traveling through a vehicle transportation network, such as the vehicle transportation network 208, the teachings herein may be used in any area navigable by a vehicle, which areas are collectively referred to as a vehicle transportation network. The system 300 includes a vehicle 302, sensors 304, scene understanding module 306, hazard recognition module 308, a hazard ML model 308A, gesture recognition module 310, a gesture ML model 310A, a communication module 312, a display module 312A, an input module 312B, a motion planner 314, and a control system 316. Other examples of the system 300 can include more, fewer, or other components.

The vehicle 302 may be the same as or similar to the vehicle 100 or the vehicle 202 of FIG. 2. The vehicle 302 includes sensors 304. The sensors 304 may correspond to the sensor 126 as described above. The sensors 304 may include one or more types of sensors, including but not limited to: monochrome cameras, stereo cameras, infrared cameras, time-of-flight cameras, Light Detection and Ranging (LiDAR) sensors, Radio Detection and Ranging (RADAR) sensors, ultrasonic sensors, microphones, and Inertial Measurement Units (IMUs). The sensors are strategically positioned both within the cabin and on the exterior of the vehicle 302 to capture a wide array of data about the internal environment, the external surroundings of the vehicle, or combinations thereof. The captured data serves as input for the subsequent modules and software components within the system 300.

The scene understanding module 306 is used to process the data from the sensors 304. The scene understanding module 306 processes the raw data collected by the diverse array of sensors 304. The scene understanding module 306 accomplishes this through a sophisticated fusion of data from various sensor types, such as, but not limited to, cameras, LiDAR, and RADAR to create a unified and accurate representation of the surroundings of the vehicle 302 using e.g., software, hardware, or a combination thereof. Leveraging advanced algorithms, the software and/or hardware detects and tracks objects in the scene, identifying their positions, velocities, and trajectories. The scene understanding module 306 further dissects the scene into distinct regions, classifying them by their semantic meaning, such as roads, sidewalks, or buildings. An important function of the scene understanding module 306 is the identification of potential hazards within the scene, achieved by analyzing the sensor data and comparing it to established patterns of dangerous situations. Additionally, the scene understanding module 306 evaluates the overall context to determine if the scene constitutes an exception scene, requiring special attention and communication with nearby individuals. Finally, the software and/or hardware may preprocess the raw sensor data, filtering out noise and converting the sensor data into suitable formats (i.e., a scene) for subsequent analysis by the hazard recognition module 308 and the gesture recognition module 310. This comprehensive processing pipeline enables the system 300 to make informed decisions and effectively communicate with humans in challenging driving scenarios.

Following the comprehensive analysis performed by the scene understanding module 306, the processed scene data (i.e., the scene) is relayed to both the hazard recognition module 308 and the gesture recognition module 310. Function of each of the hazard recognition module 308 and the gesture recognition module 310 may be performed by hardware, software, or some combination thereof.

The hazard recognition module 308 is equipped with a hazard ML model 308A and undertakes a meticulous evaluation of the scene. This evaluation aims to precisely classify the nature of the hazard present, drawing upon its training on a diverse dataset of annotated hazard scenarios. The hazard recognition module 308 may employ a variety of techniques, including but not limited to: pattern recognition, feature extraction, classification algorithms, and contextual analysis.

Pattern recognition may be used to identifying specific patterns within the scene that are indicative of different hazard types, such as the presence of emergency vehicles, road debris, or adverse weather conditions. Feature extraction may be used to extract relevant features from the scene, such as object shapes, textures, colors, and motion patterns, that can be used to distinguish between different hazard types. Classification algorithms (e.g., decision trees, support vector machines, neural networks) may be used to classify the hazard into predefined categories, such as "electrical hazard," "fire hazard," "water hazard," or "fallen object hazard." Lastly, contextual analysis may be used to consider the broader context of the scene, including the location, time of day, and surrounding environment, to refine the hazard classification and assess its potential impact on the safe operation of the vehicle.

The hazard ML model 308A is a trained machine learning model, typically based on a deep neural network architecture, that forms part of the hazard recognition module 308. The hazard ML model 308A serves as the "eye" of the vehicle 302 for identifying potential hazards in the scene.

The hazard ML model 308A is trained on a vast and diverse dataset comprising annotated images and videos, encompassing a wide range of dangerous situations such as accidents, construction zones, fallen objects, emergency vehicles, road closures, adverse weather conditions, and unusual pedestrian behavior.

To ensure the ability of the hazard ML model 308A to generalize across different scenarios, the training data incorporates information from various sensor types such as the types of the sensors 304. Each data point in the dataset includes a detailed label with the corresponding hazard type, sensor type, etc., providing the ground truth for training the model. The model architecture typically involves convolutional neural networks (CNNs) to extract relevant features from the scene data. Multiple layers within the model progressively identify increasingly complex patterns and object relationships, culminating in the accurate classification of hazards.

In some embodiments, the hazard ML model 308A is designed for real-time processing, rapidly analyzing the scene and outputting a probability distribution over various hazard types. By applying a threshold to this distribution, the most likely hazard type is determined, informing the subsequent decision-making of the vehicle 302. The accuracy and robustness of the hazard ML model 308A are continually enhanced through active learning and feedback loops, ensuring that the hazard ML model 308A remains adept at identifying and adapting to new and unforeseen hazards. The hazard ML model 308A may be initially trained by a third party and provided to the vehicle and may be updated locally or remotely, or some combination thereof.

The output of the hazard recognition module 308 is a determination of the most likely hazard type present in the scene. This information is then communicated to the communication module 312 and the motion planner 314, which may integrate the hazard type with other relevant data to formulate a response strategy (e.g., a drive plan).

Concurrently, the gesture recognition module 310, using the gesture ML model 310A, analyzes the scene to identify and interpret any communicative gestures made by people in the vicinity of the vehicle 302. The specific techniques employed by the gesture recognition module 310 may include but are not limited to: human pose estimation, gesture classification, and contextual interpretation. Human pose estimation may be used to identify the positions and orientations of key body parts (e.g., hands, arms, head) of people in the scene. Gesture classification may be used to classify, using machine learning algorithms, detected gestures into predefined categories, such as "stop," "go," "slow down," or "turn left." While contextual interpretation may be used to consider the surrounding environment and the identified hazard type to interpret the meaning of the gestures in the specific context of the exception scene.

The gesture ML model 310A is a trained machine learning model, often based on deep neural networks, designed to empower an AV with the ability to understand human communication in their immediate environment. The gesture ML model 310A is trained on an extensive dataset of hand and body movements relevant to traffic interactions, such as "stop," "go," or "turn."

The training data includes a diverse array of gestures captured from various angles, distances, and under different lighting and weather conditions. The use of different sensors may also be included in the training data. This diversity of training data ensures the ability of the gesture ML model 310A to recognize gestures regardless of the position of the person relative to the vehicle 302 or the environmental context. Additionally, the dataset includes individuals with varied clothing styles and physical appearances to avoid any demographic bias. Each gesture in the dataset is labeled with its corresponding meaning, serving as the ground truth for training the model.

The gesture ML model 310A architecture may also incorporate CNNs for feature extraction from visual data, along with techniques like Recurrent Neural Networks (RNNs) or Long Short-Term Memory (LSTM) networks to capture the temporal dynamics of gestures. Pose estimation algorithms may also be integrated to identify key body points and enhance gesture recognition accuracy. To expedite training and improve performance, the model may leverage transfer learning from pre-trained models on large-scale human pose datasets. The gesture ML model 310A may be trained by a third party and provided to the vehicle.

In some embodiments, the gesture ML model 310A analyzes incoming video streams and classifies gestures as they occur. The gesture ML model 310A can consider the surrounding context, such as the identified hazard type and the current state of the vehicle 302, to accurately interpret the meaning of the gestures. For each recognized gesture, the model outputs confidence scores, indicating the level of certainty in its prediction. These scores can be used to prioritize actions or to prompt the system to seek clarification if the confidence is low. The gesture ML model 310A continuously improves through active learning, seeking out challenging examples, and through human-in-the-loop feedback mechanisms, ensuring that the gesture ML model 310A remains adaptable to new and evolving gesture patterns. This continuous improvement may be performed locally, remotely, or some combination thereof.

The output of the gesture recognition module 310 is a set of (i.e., one or more) recognized gestures along with their interpreted meanings. This information is also relayed to the communication module 312 and the motion planner 314 for integration with the hazard type information to further refine the response strategy of the vehicle.

The motion planner 314 is an important component of the decision-making process of the AV. The motion planner 314 takes as input the scene provided by the scene understanding module 306, along with the identified hazard type from the hazard recognition module 308 and the set of recognized gestures from the gesture recognition module 310. Leveraging this comprehensive understanding of the current scene, the motion planner 314 constructs a detailed drive plan for the vehicle 302.

This drive plan is not only a predetermined sequence of actions, but a dynamic and adaptive strategy tailored to the specific circumstances of the scene. The motion planner 314 accounts for various factors, such as the nature and severity of the hazard, the available space for maneuvering, the presence and actions of nearby people, and any relevant traffic rules or regulations. The motion planner 314 then generates a series of actions, including acceleration, deceleration, steering, and potentially even stopping and/or reversing, that are designed to safely navigate the vehicle 302 through the exception scene while minimizing the risk of collisions or other undesirable outcomes.

In some embodiments, in addition to generating the drive plan, the motion planner 314 may also assess the feasibility and safety of the plan, taking into account the capabilities and limitations of the vehicle 302. If the planned actions are deemed unsafe or infeasible, the motion planner 314 may explore alternative strategies or request additional input from the human on site.

The goal of the motion planner 314 is to produce a drive plan that is both safe and efficient, enabling the vehicle 302 to navigate complex and unpredictable situations with confidence and ensuring the safety of all involved parties.

The communication module 312 serves as the central hub for orchestrating interactions between the vehicle 302 and the people in the immediate environment of the vehicle 302. The communication module 312 receives inputs from the scene understanding module 306, hazard recognition module 308, gesture recognition module 310, and the motion planner 314. The communication module 312 synthesizes this information to formulate a comprehensive communication strategy tailored to the specific exception scene.

The input from the motion planner 314 provides the communication module 312 with critical information about the planned trajectory and maneuvers of the vehicle 302 in response to the detected hazards and received gestures. This allows the communication module 312 to generate visual representations that accurately reflect the intended path and actions of the vehicle 302, enhancing the clarity and effectiveness of communication with people nearby.

The communication module 312 then leverages its display module 312A to project the visual representations, using a predefined set of intuitive symbols or icons to an area exterior to the vehicle 302. Additionally, the communication module 312 may utilize the input module 312B to receive feedback or confirmation from people in the vicinity, either through explicit gestures or responses to interactive prompts displayed by the vehicle 302. In certain situations, the communication module 312 may also interface with an LLM to generate natural language explanations or questions that can be projected to further enhance communication and clarify the intentions of the vehicle 302.

The display module 312A is the interface through which the vehicle 302 conveys its intentions and understanding of the environment to people nearby. The display module 312A receives visual representations generated by the communication module 312 and projects them onto the surrounding area in a visually perceptible manner. In some embodiments, the projection of the drive plan is strategically confined to a specific area surrounding the vehicle 302. The outer boundary of this area is defined to be within a range of 1 to 15 meters from the exterior of the vehicle 302. This distance may be selected to ensure optimal visibility and comprehension of the projected information by pedestrians, other drivers, or emergency responders who may be in the vicinity.

By limiting the projection area to this range, the system avoids overwhelming or distracting individuals who are located further away from the vehicle and may not be directly involved in the hazard navigation process. This focused projection zone ensures that the information is presented to the most relevant audience, maximizing its effectiveness in facilitating communication and collaboration. Furthermore, this constraint also helps to conserve energy and optimize the utilization of the display module 312A, as the projected visuals are concentrated within a defined area rather than being dispersed over a wider range.

In one embodiment, the display module 312A comprises a high-brightness projector capable of producing clear and visible projections even in challenging lighting conditions (e.g., daylight, low-light). The projector may be a laser projector, a digital light processing (DLP) projector, or any other suitable projection technology.

The display module 312A may be configured to project the visual representations onto a variety of surfaces in the vicinity of the vehicle 302. These surfaces may include the road, sidewalks, walls, or even the ground. The projection area can be adjusted based on the specific situation and the desired visibility. The visual representations projected by the display module 312A serve as a comprehensive communication tool, conveying a wide range of information to people in the surroundings of the vehicle 302. Primarily, the projections illustrate the intended drive plan of the vehicle 302, depicting its anticipated path, including upcoming turns, stops, and lane changes. This allows pedestrians, cyclists, and other road users to anticipate the movements of the vehicle 302 and adjust their own actions accordingly.

In addition to the drive plan, the display module 312A can project hazard indicators, which are symbols or icons that represent potential hazards detected by the sensors 304 of the vehicle 302. These indicators may include representations of pedestrians, cyclists, obstacles, or emergency vehicles, providing critical information to people nearby about the potential risks in the environment. Additionally, the display module 312A communicates the upcoming actions of the vehicle 302 through maneuver symbols, which are visual cues indicating maneuvers like slowing down, accelerating, or changing lanes. This helps to clarify the AV's intentions and enables smoother interactions with other road users.

Furthermore, the display module 312A may project interactive questions in the form of text-based prompts or queries. These questions can be used to solicit feedback or confirmation from people in the vicinity of the vehicle 302, allowing the people to actively participate in the decision-making process and enhance the overall safety of the interaction.

In some embodiments, to further enhance communication effectiveness, the display module 312A may incorporate several additional features. Dynamic animations can be employed to depict the drive plan and associated symbols of the vehicle 302, providing a more intuitive and engaging visualization of the intentions of the vehicle 302. For example, the planned trajectory could be shown as a moving line, with animated arrows indicating turns or lane changes.

In some embodiments, color coding may be utilized to differentiate various types of information within the visual representation. For example, the drive plan could be displayed in one color, while hazard indicators are shown in another. This allows for quick and easy interpretation of the information being conveyed. Additionally, color can be used to highlight specific aspects of the visual representation, such as flashing a warning symbol in a bright (e.g., red) color to draw attention to a potential hazard.

In some embodiments, the display module 312A may also be equipped with automatic brightness and contrast adjustment capabilities. This ensures optimal visibility of the projections in varying lighting conditions, such as broad daylight or nighttime darkness. By adjusting the brightness and contrast levels in real-time, the display module 312A can maintain clear and legible communication with people in the vicinity, regardless of the ambient light.

The control system 316, acting as the central nervous system of the vehicle 302, receives the finalized drive plan from the motion planner 314. The control system may be or be similar to the controller 114 of FIG. 1. The drive plan encompasses a sequence of actions, such as steering commands, acceleration/deceleration profiles, and braking instructions, that guide the vehicle 302 through the exceptional scene while adhering to safety constraints and traffic regulations. The control system 316 translates these high-level actions into precise commands for the actuators of the vehicle 302, including the steering system, throttle, and brakes. The control system 316 continuously monitors the state of the vehicle 302, comparing it to the desired trajectory outlined in the drive plan. If any deviations occur, the control system 316 dynamically adjusts the control commands to bring the vehicle 302 back on track, ensuring smooth and safe execution of the plan. This closed-loop feedback mechanism enables the vehicle 302 to respond in real-time to unforeseen events or changes in the environment, maintaining safety and stability throughout the navigation process.

Figure 4:
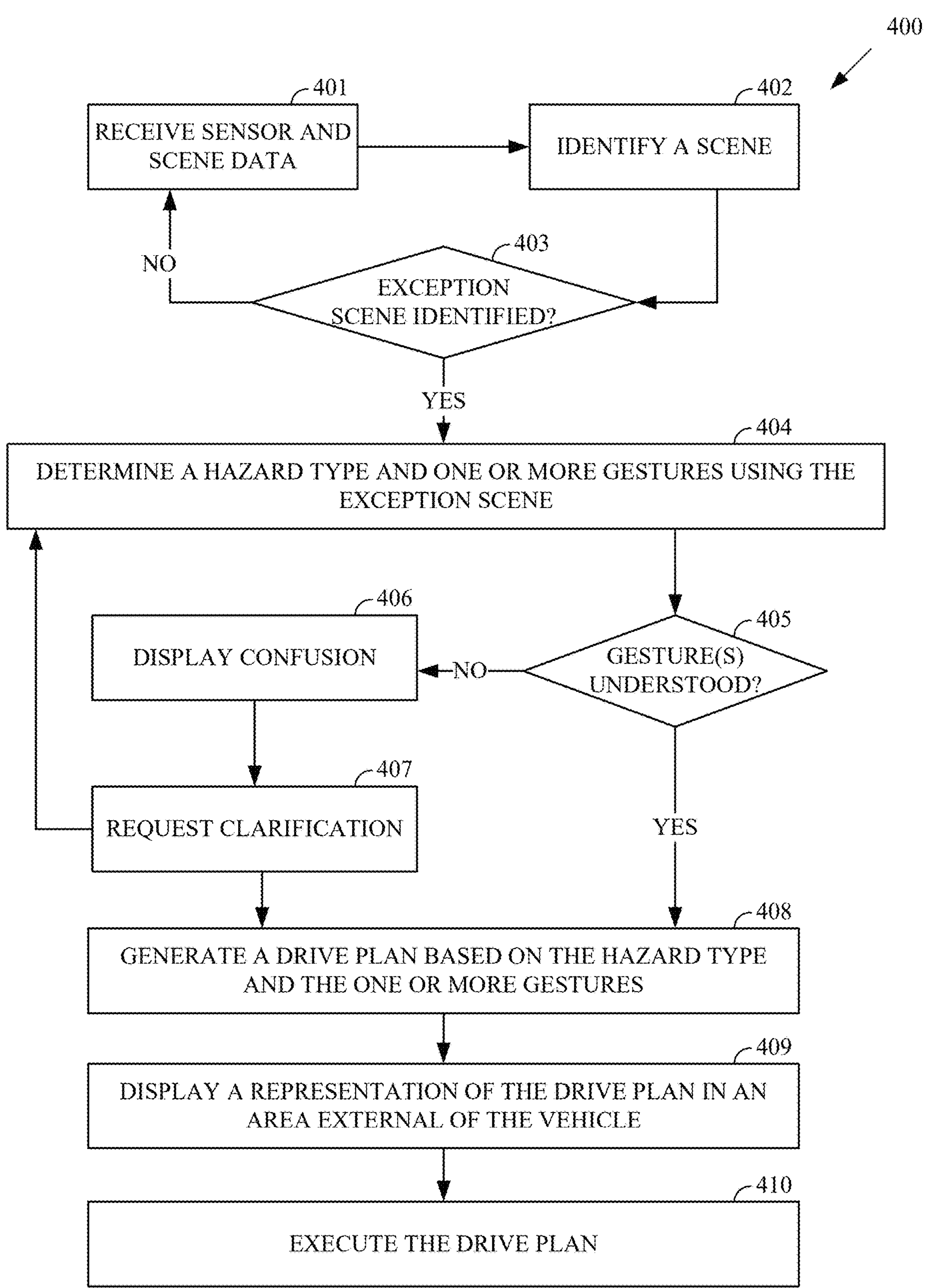
FIG. 4 is a flowchart of an example of a process for communicating vehicle intent using projection.

FIG. 4 is a flowchart diagram of an example of a technique 400 for a system to communicate vehicle intent using projection in accordance with an embodiment of this disclosure. The technique 400 can be implemented, partially or fully, by a vehicle, such as the vehicle 302 as described with respect to FIG. 3. The technique 400 can be implemented in an AV, which can be the vehicle 100 shown in FIG. 1, one of the vehicles 210/211 shown in FIG. 2, a semi-autonomous vehicle, or any other vehicle that includes drive-assist capabilities, including remote control of the vehicle. The technique 400 can be implemented as instructions that are stored in a memory, such as the memory 134 of FIG. 1. The instructions can be executed by a processor, such as the processor 133 of FIG. 1. The technique 800 may be performed in whole or in part by hardware.

At operation 401, sensor and scene data are received. That is, the system receives sensor and scene data captured by the onboard sensors of the vehicle, from other vehicles, from infrastructure cameras, etc. The system may be or be similar to the system 300 of FIG. 3. The vehicle may be or similar to the vehicle 302 of FIG. 3. The sensors may be or be similar to the sensors 304 of FIG. 3. The sensor and scene data encompasses a wide range of information used to understanding the operation of the vehicle and surrounding environment of the vehicle.

The sensor data may include but is not limited to camera data, LiDAR data, RADAR data, ultrasonic data, GPS data, IMU data or any combination thereof. The camera data may include but is not limited to images or video streams from various cameras mounted on the vehicle. The camera data provides a visual representation of the road, potential obstacles, surrounding traffic, and other pertinent objects. For instance, cameras might capture the presence of a fallen tree lying across the road or a vehicle abruptly braking ahead.

The LiDAR data may include but is not limited to three-dimensional point cloud data generated by LiDAR sensors. The LiDAR data offers highly accurate distance and shape measurements of objects in the immediate vicinity of the vehicle. The LiDAR data can help the system distinguish between a stationary object like a mailbox and a moving object like a bicyclist. The RADAR data may include but is not limited to information about the range, velocity, and angle of objects detected by RADAR sensors. The RADAR data aids in the identification and tracking of other vehicles or potential hazards. RADAR data can be useful in adverse weather conditions like fog or heavy rain.

The ultrasonic data may include but is not limited to distance measurements obtained from ultrasonic sensors. The ultrasonic data is primarily used for close-range object detection, such as during parking maneuvers or when navigating tight spaces.

The GPS data may include but is not limited to geographic coordinates and precise timing information from the GPS. The GPS data enables accurate localization and navigation of the vehicle. The GPS data may be used to determine the position of the vehicle on a map and for planning routes.

The IMU data may include but is not limited to acceleration and angular velocity measurements. The IMU data may be used for determining the orientation and movement of the vehicle in real-time. The IMU data helps the system understand if the vehicle is turning, accelerating, or braking, for example.

Scene data is a higher-level interpretation of the raw sensor data, encompassing a broader understanding of the surrounding environment. The scene data is derived through processing and analysis techniques and may include object detection and classification, lane detection and tracking, traffic sign recognition, semantic segmentation, or any combination thereof.

Object detection and classification may include but is not limited to identifying and categorizing objects in the scene, such as vehicles, pedestrians, cyclists, or other potential obstacles, allowing the system to distinguish between different types of entities. For example, the system might identify a fallen power line near the road as a potential hazard.

Lane detection and tracking may include but is not limited to determining the precise position of the vehicle within lane markings and predicting upcoming lane changes. Lane detection and tracking can contribute to safe and efficient navigation. This is desirable for maintaining the position of the vehicle within a lane and avoiding unintentional drifting.

Traffic sign recognition may include but is not limited to identifying and interpreting traffic signs, including speed limits, stop signs, yield signs, and other regulatory signage, ensuring compliance with traffic laws, etc. Traffic sign recognition can help the vehicle adhere to speed limits and obey traffic signals.

Semantic segmentation may include but is not limited to pixel-level classification of the scene, distinguishing between road surfaces, sidewalks, buildings, vegetation, and other elements. Semantic segmentation can provide a detailed contextual understanding of the environment. This can be useful for identifying drivable areas and potential off-road hazards.

By fusing raw sensor data with processed scene data, the system gains a comprehensive and continuously updated understanding of the surroundings of the vehicle. This comprehensive awareness is used for a multitude of driving functions including the detection and avoidance of hazards, as elaborated upon below.

At operation 402, the system performing the technique 400 identifies (determines, receives, obtains) a scene using the received sensor and scene data from operation 401.

At operation 403, the system determines if an exception scene has been identified. That is, the scene identified at operation 402 may or may not correspond to an exception scene. The scene may be an exception scene when the system detects an anomaly or deviation from normal operating conditions through a combination of sensor inputs from the vehicle and data analysis. The exception scene may be indicated (i.e., identified) by the presence of a potential hazard (e.g., at least one potential hazard) to the safe operation of the vehicle, such as a pedestrian unexpectedly crossing the road, a sudden obstacle in the path of the vehicle, or an emergency vehicle approaching with flashing lights and sirens. The exception scene may also be indicated by a detection of certain environmental conditions like dense fog, heavy rain, or icy roads. The ability of the vehicle to recognize and respond to these exception scenes is desirable for ensuring the safety and efficiency of autonomous driving.

If the scene is an exception scene at operation 403, the system continues to operation 404; otherwise, the system proceeds back to operation 401 to receive additional sensor and scene data to identify another scene.

At operation 404, a hazard type and one or more gestures are determined based on the exception scene. That is, the system 300 analyzes the exception scene to identify the specific type of hazard present. This hazard classification may encompass various categories such as electrical hazard, fire hazard, water hazard, fallen object hazard, crash hazard, or an unknown hazard present in the roadway. The hazard recognition may be performed by the hazard recognition module 308 of FIG. 3. Concurrently, the system employs advanced image processing and pattern recognition techniques to extract and interpret one or more distinct gestures exhibited by individuals in the vicinity of the vehicle within the exception scene. These gestures, such as hand signals or body movements, are provided by individuals aiming to guide the vehicle safely around the identified hazard. The gesture recognition may be performed using the gesture recognition module 310 of FIG. 3. By integrating both hazard type and these external gestures, the system establishes a comprehensive understanding of the current driving context, enabling subsequent decision-making processes and appropriate system responses.

In determining the hazard type, the system may leverage machine learning algorithms trained on vast datasets of labeled driving scenarios. These algorithms can effectively recognize and categorize different types of hazards based on visual cues present in the exception scene as described in detail above in reference to the hazard recognition module 308 of FIG. 3. Moreover, the gesture recognition capabilities of the system may employ similar machine learning approaches or alternative techniques such as skeletal tracking or optical flow analysis to accurately identify and interpret the gestures as described in more detail above in reference to the gesture recognition module 310 of FIG. 3.

At operation 405, the system determines if the one or more gestures are understood (recognized, identified, determined) with a desired level of confidence. In other words, the system assesses the reliability of the gesture(s) to ensure that they are accurately interpreted and can be confidently used in subsequent decision-making processes. The assessment is based on a predetermined confidence threshold, which represents the minimum level of certainty required for the system to consider a gesture as valid and reliable. The confidence level of a gesture can be determined through various methods, such as probability scores, temporal consistency, contextual information, or any combination thereof.

In some embodiments, the gesture recognition algorithms may output probability scores for each identified gesture, indicating the likelihood of the gesture being correctly interpreted. These scores can be compared to the confidence threshold to determine if the gesture is deemed reliable. In some embodiments, the system may analyze the consistency of the gesture over multiple frames of the exception scene. A gesture that is consistently detected over time is more likely to be a genuine intention rather than a random movement. In some embodiments, the system may consider the surrounding context, such as the presence of other objects or the vehicle's current state, to further validate the interpretation of the gesture. For example, a hand gesture indicating "stop" is more likely to be reliable if the vehicle is approaching a hazard.

If the confidence level of one or more gestures meets or exceeds the predefined threshold, the system proceeds to incorporate these gestures into the generation of the drive plan at operation 408. However, if the confidence level falls below the threshold, the system proceeds to operation 406. By ensuring a high level of confidence in the interpreted gestures, the system enhances the safety and reliability of the subsequent decision-making and control actions.

At operation 406, the system displays confusion. That is, if the system is unable to confidently interpret a gesture or a gesture contradicts other scene information or is unclear, the system communicates confusion. The confusion may be visually represented through the projection of a designated symbol, such as a question mark or an icon representing confusion or uncertainty, onto the area external to the vehicle as described in more detail below with regards to FIG. 5B.

At operation 407, the system requests clarification. That is, if the system encounters ambiguous or contradictory gestures, or if a gesture does not meet the predetermined confidence threshold, the system proactively seeks clarification to ensure accurate interpretation and safe decision-making. This clarification process may involve a combination of visual and auditory cues, tailored to effectively communicate with an involved individual or individuals. The clarification process may involve a combination of visual and auditory cues, tailored to effectively communicate with the individual(s). The involved individual may be an external observer of the exception scene.

In some embodiments, the system may project a specific symbol or message onto the external display area, indicating the need for clarification. This could include a question mark, a text prompt requesting clarification (e.g., "Please clarify your gesture"), or even a dynamic animation highlighting the ambiguous or conflicting gestures observed. The visual cues are designed to be clear, concise, and easily understandable, even in challenging lighting or environmental conditions.

In some embodiments, the system may also utilize auditory signals to request clarification. This could involve emitting a series of beeps, chimes, or other distinct sounds to attract the attention of nearby individuals and prompt them to provide clearer guidance. The auditory signals may be accompanied by spoken prompts, synthesized using text-to-speech technology, to explicitly convey the need for clarification and offer specific instructions on how to provide clearer gestures or feedback.

In some embodiments, the system may combine the use of visual and auditory cues. Using a combination of visual and auditory cues the system may engage with individuals in the vicinity, fostering a collaborative effort to resolve any ambiguity or uncertainty regarding the intended guidance. This proactive clarification process enhances the safety and reliability of the hazard navigation system, ensuring that the actions of the vehicle are aligned with the intentions of those providing assistance.

At operation 408, a drive plan is generated based on the hazard type and the one or more gestures. That is, upon determining the hazard type and interpreting the gestures of individuals in the vicinity of the vehicle, the system proceeds to generate a drive plan tailored to the specific situation. The drive plan may be generated using the motion planner 314 of FIG. 3 as described above. The drive plan encompasses a sequence of actions or maneuvers designed to enable the vehicle to safely navigate the identified hazard. The system leverages the gathered information, including the nature and severity of the hazard, the location and direction of the gestures, and the current state of the vehicle, to formulate an optimal course of action.

The generated drive plan may involve various actions such as adjusting the speed of the vehicle, altering the trajectory of the vehicle, initiating a lane change, or coming to a complete stop. These actions are strategically determined to mitigate the risk posed by the hazard while adhering to traffic regulations and ensuring the safety of both the vehicle occupants and other road users. The system may utilize pre-defined rules, decision trees, or sophisticated algorithms to assess the available options and select the most appropriate actions for inclusion in the drive plan. The drive plan may also be dynamically updated in real-time as the situation evolves, incorporating new information or responding to changes in the hazard or the gestures of nearby individuals.

At operation 409, a representation of the drive plan is displayed in an area external of the vehicle. In other words, the generated drive plan is translated into a visually perceptible representation and projected onto a designated area external to the vehicle. This external display serves to communicate the intended maneuvers and actions of the vehicle to individuals in the vicinity, particularly those who have provided guidance through gestures. The representation may encompass a variety of visual elements, such as arrows indicating the planned trajectory, symbols representing specific actions like braking or turning, or textual cues conveying additional information.

The external display utilizes the existing lighting systems or dedicated projection modules of the vehicle to render the representation in a clear and unambiguous manner. The projection area is strategically chosen to ensure optimal visibility for the intended audience, typically encompassing the ground or other surfaces in front of or around the vehicle. The visual cues are designed to be easily comprehensible, even in varying lighting conditions or from different viewing angles. By effectively communicating the drive plan to external parties, the system fosters a collaborative approach to hazard navigation, enhancing overall safety and minimizing the risk of misinterpretations or misunderstandings.

Figure 5A:
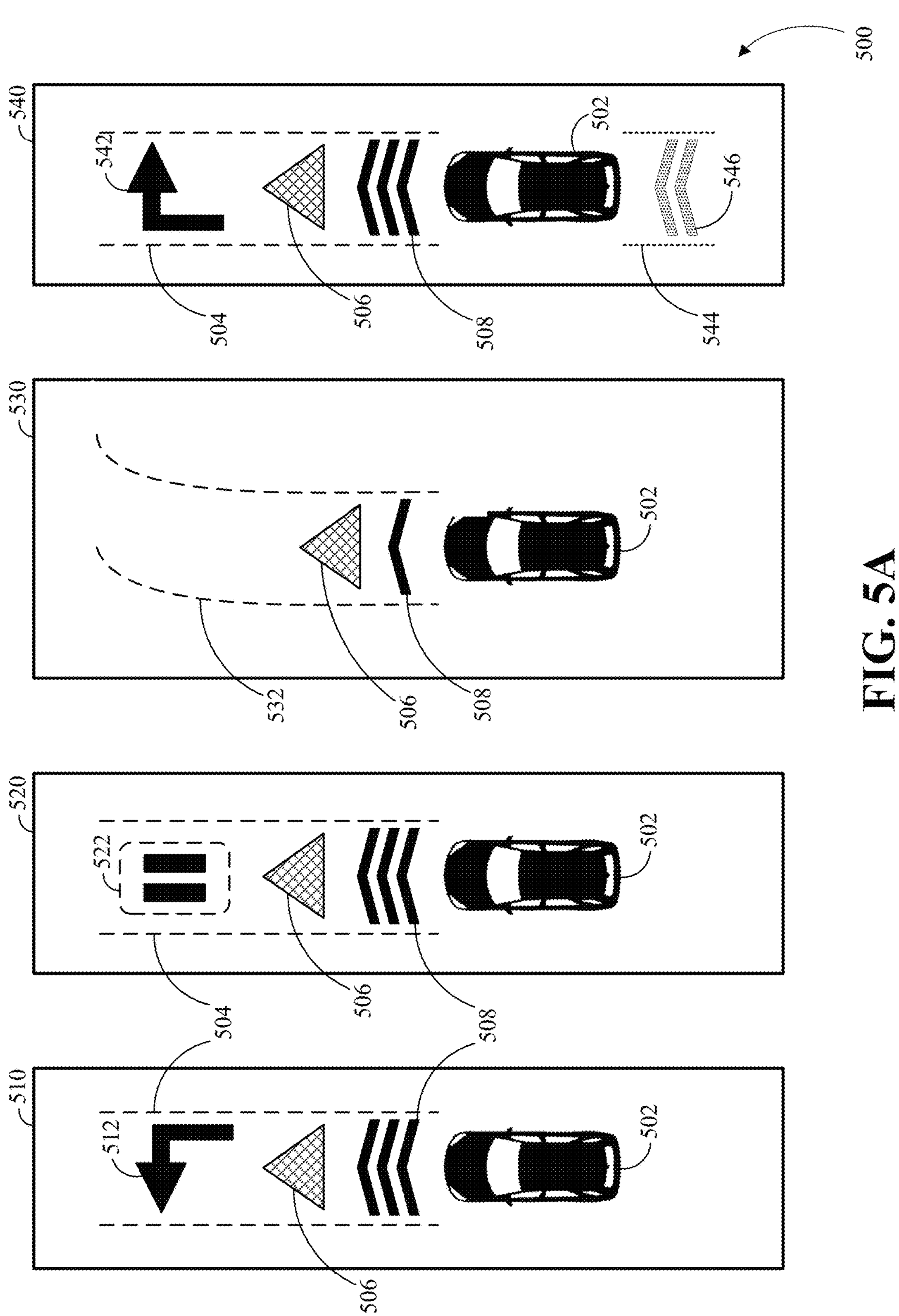
FIGS. 5A and 5B are illustrations of displaying a representation of a drive plan using projection.
Figure 5B:
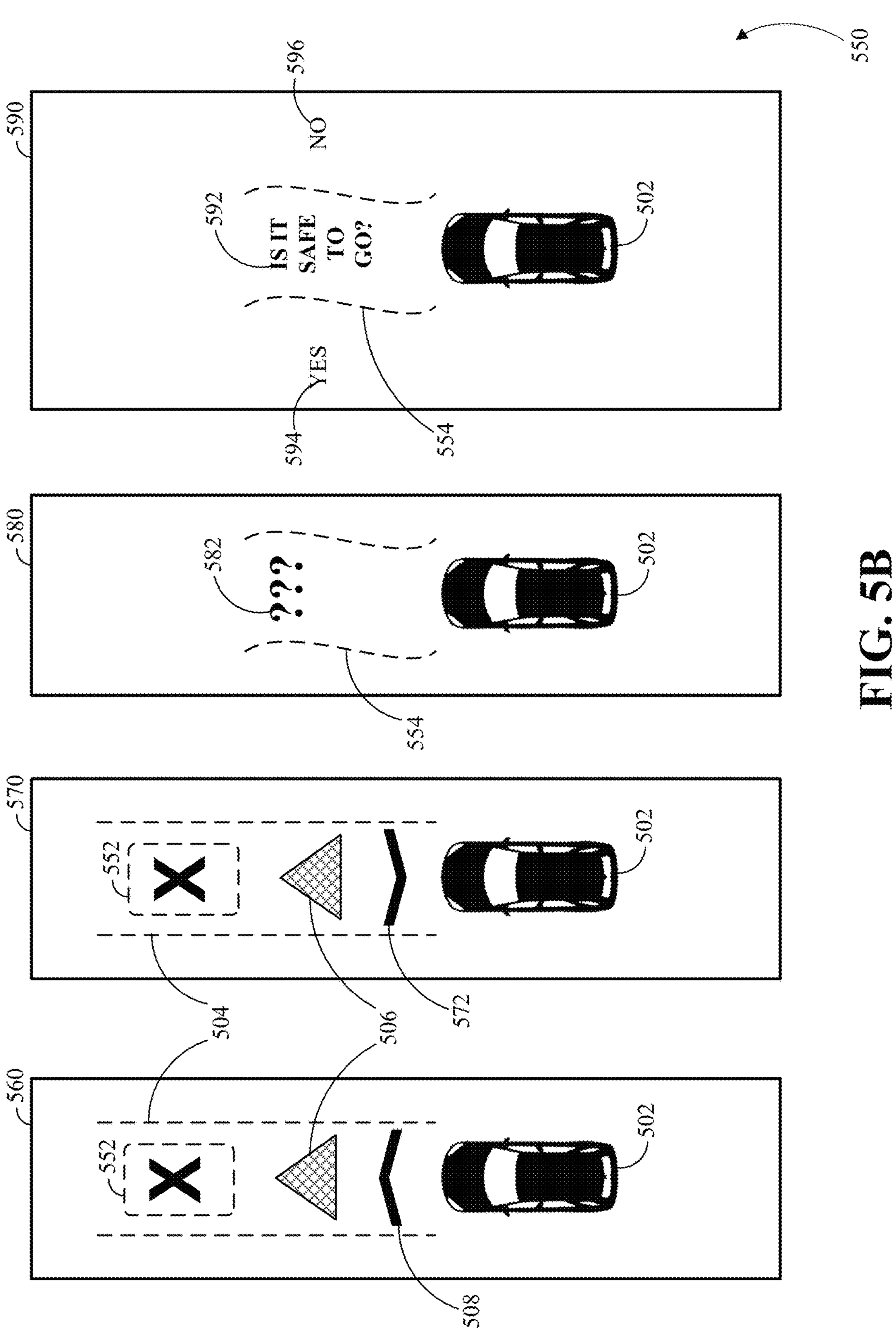

FIGS. 5A and 5B are illustrations of displaying a representation of a drive plan using projection. FIG. 5A provides several examples 510, 520, 530, 540 of how symbols can be used to represent each step of a drive plan. While a vehicle 502 is depicted in FIGS. 5A and 5B to illustrate the current position and orientation of the vehicle relative to the projected drive plan, it is important to note that the display of the vehicle itself is not part of the drive plan representation. Additionally, FIGS. 5A and 5B are intended to be illustrative and are not necessarily drawn to scale. The relative sizes and positions of the elements within the figures may be adjusted for clarity and visual representation.

In example 510, the current position of the vehicle is indicated by the vehicle 502. The vehicle 502 may be or be similar to the vehicle 302 of FIG. 3. Straight drive lines 504 project the intended path forward of the vehicle 502. The presence of a hazard is communicated through a hazard symbol 506, which could be tailored to represent the specific type of hazard detected. Forward drive arrows 508 emphasize the intention of the vehicle 502 to continue moving ahead. Finally, a left turn arrow 512 signals that the vehicle 502 will turn left once it has cleared the area defined by the straight drive lines 504. The combination of symbols creates a clear visual language, conveying the planned movements of the vehicle 502 to anyone nearby.

In example 520 of FIG. 5A, the current position of the vehicle is indicated by vehicle 502. Straight drive lines 504 project the intended path of the vehicle 502 straight ahead. Hazard symbol 506, which can be customized to represent the specific type of hazard detected (e.g., an electrical hazard symbol), communicates the presence of a hazard. In this example, the pause symbol 522 indicates that upon reaching the end of the projected path, vehicle 502 will come to a stop while determining the next steps of the drive plan.

In example 530 of FIG. 5A, the current position of the vehicle is indicated by vehicle 502. Curved drive lines 532, arcing to the right, project the intended path of the vehicle 502, signifying a planned rightward turn. The degree of curvature of the curved drive lines 532 may be adjusted to visually indicate the sharpness of the intended turn, providing additional information to onlookers about the anticipated maneuver of the vehicle 502. Hazard symbol 506, which can be customized to represent the specific type of hazard, communicates the presence of a hazard. Forward drive arrows 508 indicate the intention of the vehicle 502 to move forward.

In example 540, the current position of the vehicle is indicated by vehicle 502. Straight drive lines 504 project the intended path forward of the vehicle 502. The presence of a hazard is communicated through a hazard symbol 506, which could be tailored to represent the specific type of hazard detected. Forward drive arrows 508 emphasize the intention of the vehicle 502 to continue moving ahead. Additionally, a right turn arrow 512 signals that the vehicle 502 will turn right once it has cleared the area defined by the straight drive lines 504.

Furthermore, example 540 includes additional visual elements to convey the recent movements of the vehicle 502. Past drive lines 544 are displayed tracing the path the vehicle 502 has already taken. In some embodiments, the past drive lines 544 may be displayed as dotted or faded lines. The past drive lines 544 may extend behind the current position of the vehicle 502, providing context for the current trajectory and planned maneuvers of the vehicle 502. In conjunction with the past drive lines, past drive forward actions 546 indicate the previous forward movements of the vehicle 502. In some embodiments, the past drive forward actions may be depicted as faded or semi-transparent forward arrows. The inclusion of these past actions enhances the overall understanding of the drive plan, allowing observers to discern not only the future intentions of the vehicle 502 but also its recent history. This additional information can be particularly valuable in complex scenarios where the past movements of the vehicle 502 may influence its current decision-making or the interpretation of its planned actions.

FIG. 5B provides several examples 560, 570, 580, 590 of how symbols can be used to represent each step of a drive plan. In example 560 of FIG. 5B, the current position of the vehicle is indicated by vehicle 502. Straight drive lines 504 combined with the forward drive arrow 508 project the intended path of the vehicle 502 straight ahead. Hazard symbol 506, which can be customized to represent the specific type of hazard detected, communicates the presence of a hazard. In this example, the stop symbol 552, combined with the straight drive lines 504 terminating abruptly, indicates that the vehicle 502 may encounter an impassable obstacle or condition at the end of its current path, potentially resulting in the vehicle 502 becoming stuck or immobilized. This visual representation alerts bystanders to the potential for the vehicle 502 to become trapped and may prompt bystanders to offer assistance or to avoid the area.

In example 570 of FIG. 5B, the current position of the vehicle is indicated by vehicle 502. Straight drive lines 504 combined with the backward drive arrow 572 project the intended path of the vehicle 502 straight backwards. Hazard symbol 506, which can be customized to represent the specific type of hazard detected, communicates the presence of a hazard. In this example, the stop symbol 552, combined with the straight drive lines 504 terminating abruptly, indicates that the vehicle 502 may encounter an impassable obstacle or condition at the end of its current path, potentially resulting in the vehicle 502 becoming stuck or immobilized.

In example 580 of FIG. 5B, the current position of the vehicle is indicated by vehicle 502. Distorted (i.e., wavy) drive lines 554 deviating from a straight or predictable path, visually communicate uncertainty in the ability of the vehicle 502 to determine a safe course of action. This could arise due to a complex or ambiguous environment, conflicting sensor data, or other factors that hinder the vehicle's decision-making processes. The presence of question marks 582 further emphasizes this uncertainty or confusion, indicating that the vehicle 502 is actively seeking guidance or clarification from external sources to navigate the situation safely. This representation effectively alerts nearby individuals to the need of the vehicle 502 for assistance and encourages them to provide additional information or direction to help resolve the uncertainty.

In example 590 of FIG. 5B, the current position of the vehicle is indicated by vehicle 502. Distorted (i.e., wavy) drive lines 554 deviating from a straight or predictable path, visually communicate uncertainty in the ability of the vehicle 502 to determine a safe course of action. The presence of a question 592, such as "Is it safe to go?", further emphasizes this uncertainty and actively seeks guidance or clarification from external sources, like pedestrians, other drivers, emergency responders, etc. To facilitate a response, the vehicle may also project potential responses to the question, such as response 594 ("YES") and response 596 ("NO"). These projected responses allow bystanders to quickly and clearly communicate their assessment of the situation to the vehicle 502 (e.g., using a gesture), enabling the vehicle to make a more informed decision and proceed safely. This interactive element fosters collaboration between the vehicle 502 and its surroundings, enhancing safety in uncertain or complex driving scenarios.

In some embodiments, the interactive question 592 and potential responses 594, 596 in example 590 of FIG. 5B may be generated using an LLM. The LLM may be utilized to formulate contextually relevant questions based on the specific circumstances of the exception scene, taking into account the type of hazard, the position of the vehicle, and any available sensor data. The LLM can also generate a range of potential responses that are tailored to the question and the anticipated feedback from bystanders. By leveraging the capabilities of an LLM, the system can effectively communicate with humans in a natural and intuitive manner, enhancing the overall effectiveness of the interactive hazard navigation process.

Figure 6:
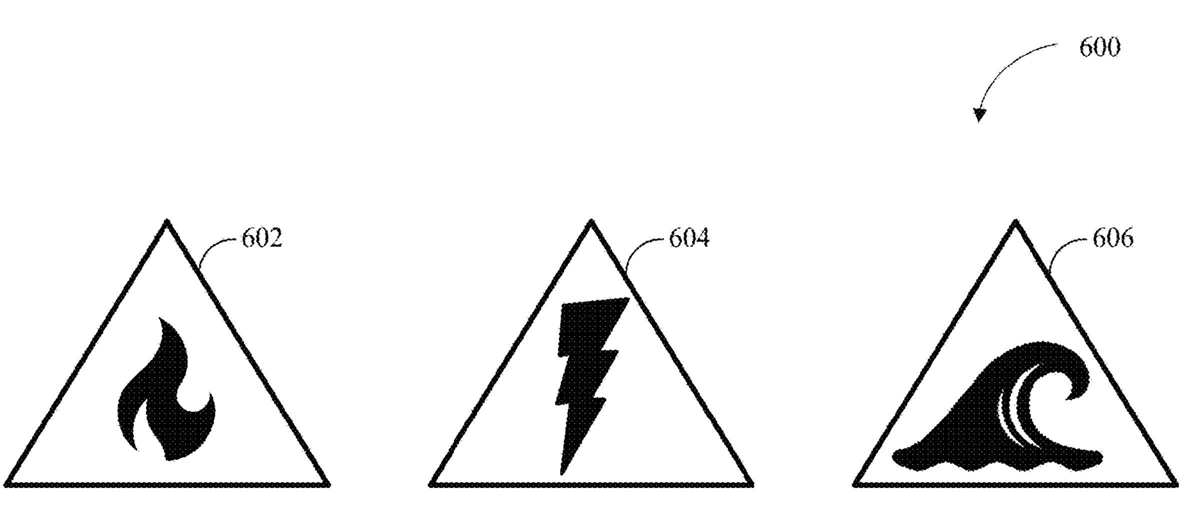
FIG. 6 is an illustration of symbols used to display a hazard type.
Figure 6:
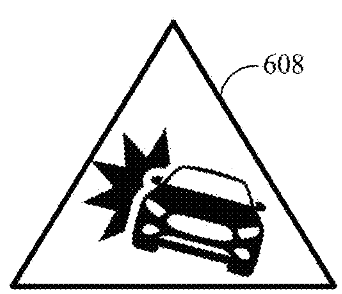
Figure 6:
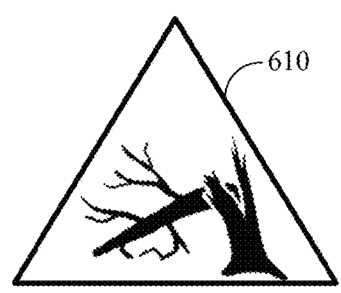
Figure 6:
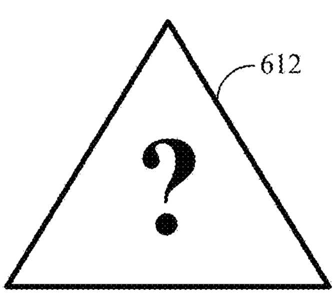
Figure 6:
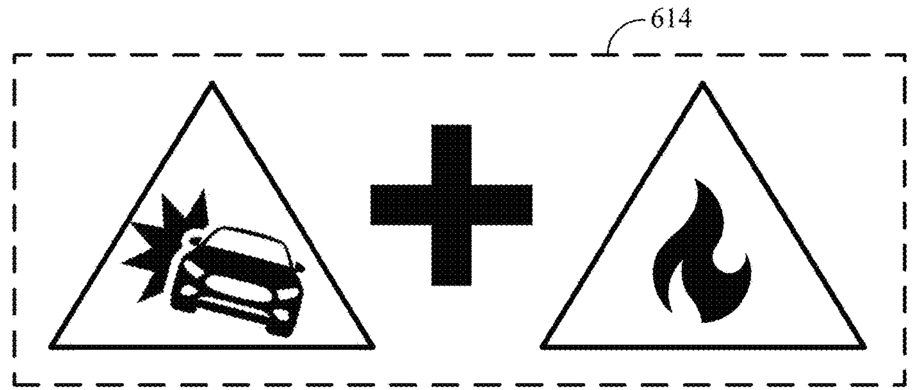

FIG. 6 is an illustration 600 showcasing exemplary symbols that can be used to visually represent different hazard types within the system. While illustration 600 depicts six symbols for six specific hazards, it is important to note that this is not an exhaustive list, and other symbols may be employed to represent additional or alternative hazard types. Moreover, the specific design of the symbols shown is not prescriptive, and different graphical representations may be utilized to convey the same hazard types.

In this illustrative example, symbol 602 depicts a fire hazard, using a stylized flame icon. Symbol 604 represents an electrical hazard, through a lightning bolt. Symbol 606 denotes a water hazard, utilizing a wave pattern. Symbol 608 signifies a crash hazard, which can also be illustrated with a collision icon or warning sign. Symbol 610 represents a fallen tree hazard, incorporating a tree silhouette but may also use a fallen log graphic. Finally, symbol 612 indicates an unknown hazard, through a question mark.

The flexibility in both the range of represented hazards and the specific symbol designs allows for customization and adaptability to different driving environments and scenarios. The system can be configured to utilize a set of symbols that best aligns with the specific hazards encountered in a particular region or context, ensuring clear and effective communication of potential dangers to both the vehicle and individuals in its vicinity.

Additionally, the system is not limited to displaying a single hazard symbol at a time. In scenarios where the exception scene involves multiple hazards or a combination of hazards, the system can dynamically display multiple relevant hazard symbols simultaneously. For example, as depicted by symbol combination 614, if the vehicle detects both a crash (symbol 608) and a fire hazard (symbol 602) both symbols can be projected together to provide a comprehensive representation of the combined hazards. In another example, if the vehicle detects both a fallen tree (symbol 610) and an electrical hazard (symbol 604) in the roadway, both symbols can be projected together to provide a comprehensive representation of the combined hazards present. This allows for a more nuanced and informative display, alerting bystanders to the full complexity of the situation and enabling the bystanders to offer more targeted assistance or to otherwise take appropriate precautions.

Referring again to FIG. 4, the drive plan is executed at operation 410. That is, the control system of the vehicle initiates the execution of the generated drive plan. The control system of the vehicle may be the control system 316 of FIG. 3. This entails translating the planned actions and maneuvers into specific control signals for the actuators of the vehicle, such as the steering system, acceleration/braking mechanisms, and potentially other relevant components. The control system precisely coordinates the activation and modulation of these actuators to guide the vehicle along the intended path and execute the prescribed actions, ensuring safe navigation around the identified hazard.

Herein, the terminology "passenger", "driver", or "operator" may be used interchangeably. Also, the terminology "brake" or "decelerate" may be used interchangeably. As used herein, the terminology "processor", "computer", or "computing device" includes any unit, or combination of units, capable of performing any method, or any portion or portions thereof, disclosed herein.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special-purpose processor or circuitry that may include specialized hardware for carrying out any of the methods, algorithms, aspects, or combinations thereof, as described herein. In some embodiments, portions of the instructions may be distributed across multiple processors on a single device, or on multiple devices, which may communicate directly or across a network, such as a local area network, a wide area network, the Internet, or a combination thereof.

As used herein, the term "memory subsystem" includes one or more memories, where each memory may be a computer-readable medium. A memory subsystem may encompass memory hardware units (e.g., a hard drive or a disk) that store data or instructions in software form. Alternatively, or in addition, the memory subsystem may include data or instructions that are hard-wired into processing circuitry.

As used herein, the terminology "example," "embodiment," "implementation," "aspect," "feature," or "element" indicate serving as an example, instance, or illustration. Unless expressly indicated otherwise, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise or clearly indicated otherwise by the context, "X includes A or B" is intended to indicate any of the natural inclusive permutations thereof. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of operations or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and/or elements.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method, comprising:

receiving an exception scene generated using scene data captured by one or more systems of a vehicle, wherein the exception scene is indicated by a detection of at least one potential hazard to a safe operation of the vehicle and the vehicle comprises a projector;

determining a hazard type associated with the at least one potential hazard and one or more gestures using the exception scene, wherein the hazard type is at least one of an electrical hazard, a fire hazard, a water hazard, a fallen object hazard, a crash hazard, or an unknown hazard;

generating a drive plan for the vehicle based on the hazard type and the one or more gestures;

displaying, using the projector, a representation of the drive plan in an area external to the vehicle in a visually perceptible manner, wherein the representation of the drive plan includes a hazard symbol that visually represents the hazard type and a path symbol that visually represents a motion to be taken by the vehicle to safely navigate the exception scene; and executing, by a control system of the vehicle, the drive plan.

2. The method of claim 1, wherein the one or more gestures are hand and body movements detected within the exception scene and the one or more gestures provide a direction for navigating the exception scene.

3. The method of claim 1, wherein the hazard type is an unknown hazard and responsive to the hazard type being an unknown hazard a symbol representing confusion is associated with the hazard type.

4. The method of claim 1, wherein the drive plan includes one or more actions, wherein the one or more actions allow the vehicle to safely navigate the exception scene.

5. The method of claim 4, wherein generating the drive plan comprises:

associating at least one of the one or more actions with a symbol that visually represents a motion to be taken by the vehicle to safely navigate the exception scene.

6. The method of claim 4, wherein the drive plan includes an interactive question.

7. The method of claim 6, wherein the interactive question is generated using a large language model (LLM).

8. The method of claim 1, wherein an outer boundary of the area exterior to the vehicle is between 1 and 15 meters from the vehicle.

9. An apparatus, comprising:

a memory subsystem; and one or more processors configured to execute instructions stored in the memory subsystem to:

receive an exception scene generated using scene data captured by one or more systems of a vehicle, wherein the exception scene is indicated by a detection of at least one potential hazard to a safe operation of the vehicle and the vehicle comprises a projector;

determine a hazard type associated with the at least one potential hazard and one or more gestures using the exception scene, wherein the hazard type is at least one of an electrical hazard, a fire hazard, a water hazard, a fallen object hazard, a crash hazard, or an unknown hazard;

generate a drive plan for the vehicle based on the hazard type and the one or more gestures;

display, using the projector, a representation of the drive plan in an area external to the vehicle in a visually perceptible manner, wherein the representation of the drive plan includes a hazard symbol that visually represents the hazard type and a path symbol that visually represents a motion to be taken by the vehicle to safely navigate the exception scene; and execute, by a control system of the vehicle, the drive plan.

10. The apparatus of claim 9, wherein the one or more gestures are hand and body movements detected within the exception scene and the one or more gestures provide a direction for navigating the exception scene.

11. The apparatus of claim 9, wherein the drive plan includes one or more actions, wherein the one or more actions allow the vehicle to safely navigate the exception scene.

12. The apparatus of claim 11, wherein generating the drive plan comprises:

associating at least one of the one or more actions with a symbol that visually represents a motion to be taken by the vehicle to safely navigate the exception scene.

13. The apparatus of claim 11, wherein the drive plan includes an interactive question generated using a large language model (LLM).

14. A non-transitory computer-readable medium storing instructions operable to cause one or more processors to perform operations comprising:

receiving an exception scene generated using scene data captured by one or more systems of a vehicle, wherein the exception scene is indicated by a detection of at least one potential hazard to a safe operation of the vehicle and the vehicle comprises a projector;

determining a hazard type associated with the at least one potential hazard and one or more gestures using the exception scene, wherein the hazard type is at least one of an electrical hazard, a fire hazard, a water hazard, a fallen object hazard, a crash hazard, or an unknown hazard;

generating a drive plan for the vehicle based on the hazard type and the one or more gestures;

displaying, using the projector, a representation of the drive plan in an area external to the vehicle in a visually perceptible manner, wherein the representation of the drive plan includes a hazard symbol that visually represents the hazard type and a path symbol that visually represents a motion to be taken by the vehicle to safely navigate the exception scene; and executing, by a control system of the vehicle, the drive plan.

15. The non-transitory computer-readable medium of claim 14, wherein the drive plan includes one or more actions that allow the vehicle to safely navigate the exception scene and generating the drive plan comprises:

associating at least one of the one or more actions with a symbol that visually represents a motion to be taken by the vehicle to safely navigate the exception scene.

16. The non-transitory computer-readable medium of claim 14, wherein the one or more gestures are hand and body movements detected within the exception scene and the one or more gestures provide a direction for navigating the exception scene.

17. The non-transitory computer-readable medium of claim 14, wherein the drive plan includes an interactive question.

18. The non-transitory computer-readable medium of claim 17, wherein the interactive question is generated using a large language model (LLM).

* * * * *